No. 822,274. PATENTED JUNE 5, 1906.
C. F. HAWK.
PIANO TRUCK.
APPLICATION FILED JUNE 9, 1905.
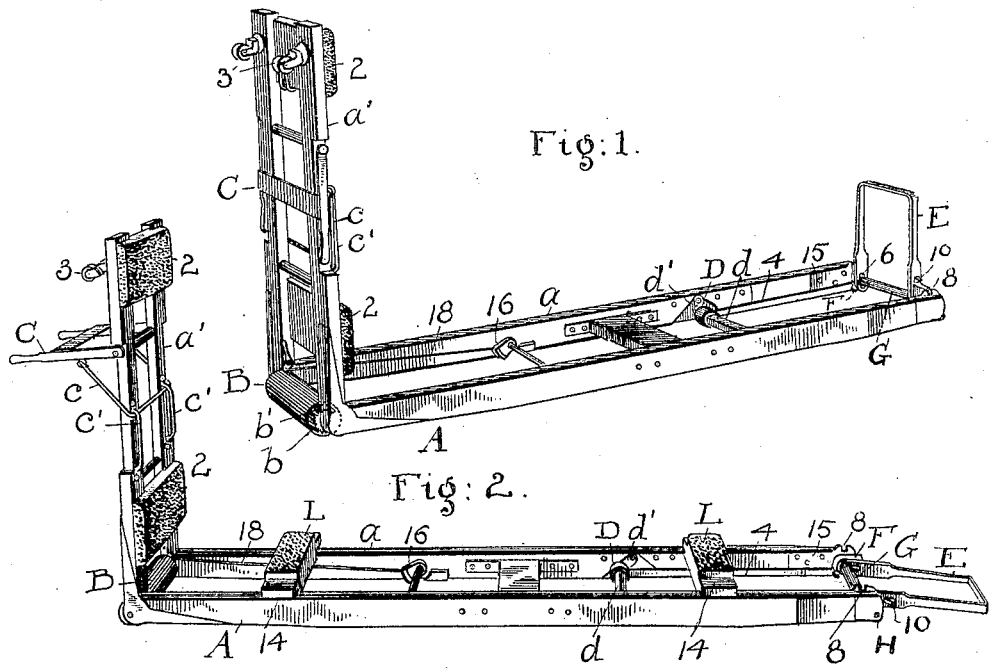
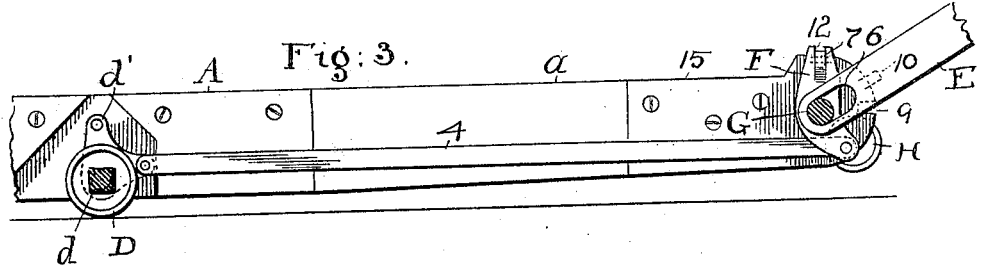
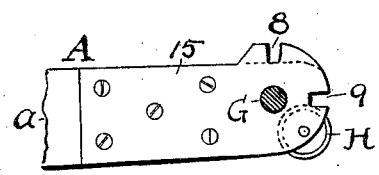
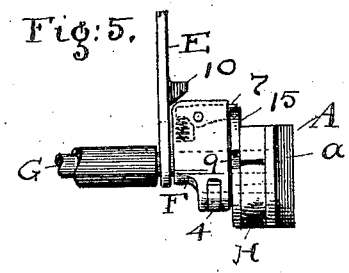
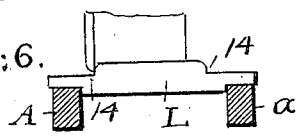
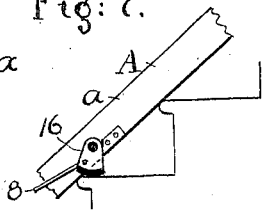
ATTEST.
R. B. Moser
C. A. Sell
INVENTOR.
Charles F. Hawk
By H. J. Fisher, ATTY.

UNITED STATES PATENT OFFICE.

CHARLES F. HAWK, OF CLEVELAND, OHIO.

PIANO-TRUCK.

No. 822,274.
Specification of Letters Patent.
Patented June 5, 1906.

Application filed June 9, 1905. Serial No. 264,503.

*To all whom it may concern:*

Be it known that I, CHARLES F. HAWK, a citizen of the United States, residing at Cleveland, in the county of Cuyahoga and State of Ohio, have invented certain new and useful Improvements in Piano-Trucks; and I do declare that the following is a full, clear, and exact description of the invention, which will enable others skilled in the art to which it appertains to make and use the same.

My invention relates to piano-trucks; and the invention consists in the construction of trucks and the combination and arrangement of parts therein, substantially as shown and described, and particularly pointed out in the claims.

In the accompanying drawings, Figure 1 is a perspective view of the truck and its movable parts in one relation; and Fig. 2 is a perspective view of the truck with the movable parts in another relation, as hereinafter more fully described. Fig. 3 is a longitudinal sectional elevation of one side of one end of the truck, showing particularly the means for adjusting the middle carrying roller or rollers. Fig. 4 is a detail of one end of one side of the truck, showing the notches for locking the adjusting bail-heads in one position or the other, as in Figs. 1 and 2; and Fig. 5 is an end elevation of the portion of the rear end of the truck shown in Fig. 3. Fig. 6 is a cross-section of the truck-frame, showing the construction and arrangement of one of the removable bolsters thereon, as also seen in Fig. 2. Fig. 7 is a view of the truck upon a stair with the safety-catch in action.

The idea of the invention as thus shown is to provide a truck which is adapted to handle pianos of different styles of construction with the least expenditure of energy and the greatest facility and with the protection of the piano from injury upon its surface or otherwise by reason of being handled and shipped in this way. To these ends I provide a rigid right-angled frame A, each angle of which is provided with means both for handling the truck and for rolling the same, as occasion may require and according as the piano or article of furniture rests upon one angle or the other. To these ends also I refer to the longer angle or portion as section or part $a$ and to the shorter angle as section or part $a'$; but both angles or sections are comprised in truck A as a whole, and the meeting point of the two angles is heavily reinforced to give it the requisite strength for rigidity and firmness. A roller B is mounted in said angle, which is large enough and is so situated as to afford a rolling-surface for both angles, according as one or the other may for the time rest upon the floor, and this particular roller is in fixed bearings and carries a ratchet-wheel $b$ at one end, and a pawl $b'$, of ordinary fashion, is adapted to engage said ratchet, so that when desired the roller can be locked by the pawl against rotation, but is free to travel in the opposite direction from its engagement by the pawl. Instead of the pawl-and-ratchet mechanism I could of course use a notched wheel, with a detent to engage therein, and thus lock the roller against turning in either direction or at any time, excepting as the detent might be disengaged. Either of these or an equivalent arrangement can be used and be within my invention.

The shorter angle or portion $a'$ of the truck is provided with handle-frame C, pivoted upon the truck and provided with a bail $c$, running in confining loops or guideways $c'$ upon the sides of the truck and which are of such length as to permit the handle-frame to fold upon the sides of the truck-frame out of the way when this is desired and also to permit it to be drawn up into a substantially horizontal position, as in Fig. 2, when it is desired to use the said handle or frame for carrying the truck. It will be noticed that the truck-frame is recessed at its sides to permit the sides of the handle-frame to lie in the said recesses out of the way when the handle-frame is folded. The said loops or guides $c'$ are raised just sufficiently to give free play to bail $c$, but are low enough to keep in a plane beneath the cushioned or carpeted supporting-surface 2 for the piano. Casters 3 are employed at the upper end of smaller section $a'$ and serve to work in conjunction with roller B when operations are upon this portion of the truck; otherwise they are idle.

Referring now to the main or longer section of the truck, $a$, I find that it is desirable to have an adjustable middle roller or rollers D upon this portion of the truck-frame, which are adapted to be raised and lowered according as they are to be used or not used. Sometimes it occurs that it is not desirable to have rollers in action at this point, and again it is desirable according to the place and conditions of use at the time to which the truck is devoted, and hence I have provided means for giving the operator control over rollers D as occasion may demand and according to the needs of operation. To this end the said rollers D are shown in this instance as two rollers or wheels mounted on a shaft $d$, carried in hangers $d'$ at each side, pivoted at their top upon the main frame and provided with connecting bars or rods 4 at the sides running to the rear end of the truck-frame, where they connect with the free rotatable heads F, supported upon cross-shaft G between the sides of the frame and bail E. Said heads are each provided with an open slot 12, in which is mounted a pivoted pawl or dog 7, adapted to engage in either one of the notches 8 and 9, respectively, in the side plates on the end of the main frame, according as one position or the other of the middle roller is desired. Bail E has longitudinal slots 6, engaged on shaft G, in which it has movement enough to engage its lugs 10 in slot 12 over dog 7 or to disengage with said slot, thus enabling the operator to use the bail as a handle portion in either position, as well as means for rotating heads F and effecting adjustment of rollers D. In one position dog 7 locks in slot or notch 8 and in the other position in slot or notch 9. Thus there is convenient and efficient control of the middle roller D from the end of the truck-frame, where bail E is accessible for this purpose when a piano is on the truck, and the roller D otherwise is covered and unapproachable by outside means and a shifting leverage is provided as well for the end of the frame.

H represents fixed rollers or wheels oppositely at the outer end of section $a$ of the truck, which are adapted to come into use, especially when an inclined ascent is begun; but they run out of service position when the truck comes bodily forward and rests upon its bottom farther back, because the bottom of the truck inclines upward from about rollers D to the end where rollers H are located. Hence if the truck be placed upon the floor the said rollers H do not come into action at all, but the rollers B and D will come into action if said rollers D are lowered for this purpose; otherwise the truck will rest on the floor apart from roller B. Obviously bail E is the leverage whereby the position of rollers D is controlled.

Another feature of the invention is the recessed slidable and movable bolsters L, which have recesses 14 in their ends and top, adapting them to be used for carrying grand pianos. In transferring these pianos it is necessary at times to set them upon their edges, and as the lids thereof overlap the immediate surfaces of the sides there must be provision upon the carrying-support for these overlapped edges or the piano-cover is liable to sustain part of the weight and be injured. Hence I have recessed these bolsters L at each end to accommodate said edges, thereby permitting the side of the piano to rest upon the cushion-surfaces above, while the edge of the cover comes in the recess.

The main portion of the truck is its longer portion $a$, with fixed rollers at its ends and adjustable between its ends, and this is referred to herein also as the "truck."

A single roller of sufficient length could be substituted for the two rollers D and be the obvious equivalent thereof.

A plate 15 is shown at each side of the truck-frame, having the notches or slots 8 and 9 therein; but the said notches or their equivalent might be otherwise provided. In this instance said notches may be regarded as practically in the end of the main frame itself.

A pivoted stop or catch 16 is mounted upon portion $a$ substantially midway between its ends, and a lever-controlled link 18 operates to throw said stop or catch into engagement with the floor to prevent back movement of the truck, and this device is especially serviceable when the truck is resting upon a flight of stairs.

What I claim is—

1. The truck-frame and suspended rollers thereon, and means for fixing the position of said rollers in respect to said frame comprising connecting-links therefor, rotatable heads to which the links are attached, a shaft on which said heads are mounted, and a bail to rotate said heads having slots in its ends engaged on said shaft.

2. In trucks for pianos, a main frame having a right-angled frame rigid with one end thereof and a roller in the angle of said parts exposed to both said frames, in combination with adjustable rollers between the ends of said main frame, a bail pivotally supported in said main frame, rotatable heads adapted to be engaged by said bail, and links connecting said rotatable heads with said adjustable rollers to raise and lower the same.

3. In piano-trucks, a truck-frame and rollers suspended therein, in combination with a cross-shaft at one end of said frame and a bail and rotatable heads on said shaft, a spring-pressed dog in each of said heads and notches in the truck-frame with which said dog is adapted to engage, said bail constructed to engage and operate said dogs.

In testimony whereof I sign this specification in the presence of two witnesses.

CHARLES F. HAWK.

Witnesses:
 R. B. MOSER,
 C. A. SELL.